US006659381B1

(12) United States Patent
Tsurumaki et al.

(10) Patent No.: US 6,659,381 B1
(45) Date of Patent: Dec. 9, 2003

(54) LIGHT-SHIELDING CLOTH FOR PHOTOGRAPHIC FILM CARTRIDGE AND PHOTOGRAPHIC FILM CARTRIDGE

(75) Inventors: Satoru Tsurumaki, Minami-ashigara (JP); Akio Imai, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/701,784

(22) PCT Filed: Jun. 1, 1999

(86) PCT No.: PCT/JP99/02903

§ 371 (c)(1), (2), (4) Date: Dec. 4, 2000

(87) PCT Pub. No.: WO99/63403

PCT Pub. Date: Dec. 9, 1999

(30) Foreign Application Priority Data

Jun. 2, 1998 (JP) .......................................... 10-169319
Nov. 13, 1998 (JP) .......................................... 10-341115

(51) Int. Cl.[7] .......................................... G03B 23/02
(52) U.S. Cl. ..................... 242/348.4; 396/513; 428/85
(58) Field of Search ..................... 242/348.4; 396/513; 428/85, 90, 91

(56) References Cited

U.S. PATENT DOCUMENTS 4,730,778 A * 3/1988 Akao et al. ............. 242/348.4
5,275,283 A * 1/1994 Akao ..................... 242/348.4
5,358,198 A * 10/1994 Lesley .................... 242/348.4

* cited by examiner

*Primary Examiner*—John Q. Nguyen
(74) *Attorney, Agent, or Firm*—Sughrue Mion, PLLC

(57) ABSTRACT

A light-shielding cloth to be fitted to a photographic film cartridge at its slit through which a film is draw out, which does not produce defects in photographic images, particularly defects in enlarged photographic images, is prepared by subjecting a cloth to raising treatment and has fiber wastes remaining on its surface cloth in a of 30 pieces per 1 cm$^2$ or less.

1 Claim, 2 Drawing Sheets

LIGHT-SHIELDING CLOTH FOR PHOTOGRAPHIC FILM CARTRIDGE AND PHOTOGRAPHIC FILM CARTRIDGE

FIELD OF INVENTION

The present invention relates to a light-shielding cloth (plush) to be fitted to a photographic film cartridge at its slit for drawing out a film, and further relates to a photographic film cartridge having the plush.

BACKGROUND OF THE INVENTION

Generally, a photographic film cartridge has a slit (or port) for drawing out a film therethrough, onto the inner surface of which a light-shielding cloth (i.e., plush) is fitted by adhesion. The plush is set in contact with a photographic film so as to keep the film from exposure to light.

FIG. 1 illustrates a section of a representative photographic film cartridge. A photographic film cartridge 10 is a light-shielding case 11 has a slit 14 for drawing out a photographic film 13 which is wound around a spool 12 and placed in the case 11. Inside of the slit 14, a pair of plushes 20*a*, 20*b* are fixed by adhesion on its upper and lower surfaces. The plushes 20*a*, 20*b* are desired to show good light-shielding property and to be flexible so that they would not give a damage on the photographic film when it is drawn out. The plushes 20*a*, 20*b* are also desired to show low resistance in the procedure of drawing out the photographic film. A photographic film cartridge for APS (i.e., Advanced Photo System), however, has no plushes.

The conventional plush is manufactured by the steps of weaving or knitting laminated two woven fabrics or knitted fabrics with pile yarns and sectioning the pile yarns along the interface between the two fabrics (See Japanese Utility Model Publications No. 37-21388 and 61-34526). In the use of thus manufactured plush, a photographic film is shielded from exposure to light by keeping it in contact with the sectioned pile yarns. The sectioned pile yarns have enough flexibility and impart appropriate resistance to the drawn photographic film.

The procedure for weaving or knitting laminated fabrics with pile yarns, however, is performed at low productivity, and hence the cost for manufacturing the conventional plushes is relatively high.

Japanese Patent Provisional Publication No. 7-152114 describes a plush which is manufactured by the steps of raising a surface of a woven fabric and shearing the raised fibers. Japanese Patent Provisional Publication No. 8-15825 describes a plush which is manufactured by the steps of inserting a weft yarn into a warp-knitted fabric and raising the inserted weft yarn.

The plushes manufactured by the procedures described in the above publications shield a photographic film from exposure to light by keeping their raised fibers in contact with the photographic film. Generally, the raising treatment can be conducted at relatively high productivity, as compared with the procedure of weaving or knitting fabrics with pile yarns. Therefore, the raising treatment for manufacture of plushes is advantageous from the viewpoint of production cost.

The step of shearing, however, sometimes imparts to the fiber-raised plush unsatisfactory light-shielding property. If plushes showing unsatisfactory light-shielding property are placed in a photographic film cartridge at its slits, a photographic film encased in the cartridge is apt to expose to light entering through the slits. In order to avoid the exposure problem, it may be considered that a number of raised fibers (hereinafter, this referred to as "raising density") on the plush is increased or a pressure of the raised fibers onto the photographic film is increased. If these measures are adopted, however, it sometimes happen that the photographic film is drawn out with increased resistance and certain difficulty.

Japanese Patent Provisional Publication No. 9-120116 proposes a plush illustrated in FIG. 2 attached hereto. The plush 20 comprises a raised woven, knitted or nonwoven fabric 22 which has raised fibers 21 having a raised height ($D_1$) in the range of 0.5 mm to 1.5 mm. It is stated that a photographic film cartridge equipped with the disclosed plushes gives satisfactorily high resistance to a photographic film in the course of drawing the film, keeping the photographic film from exposure to light.

The above-mentioned plush Tray be manufactured at high productivity and may be advantageous from the viewpoint of production cost.

As a result of study, however, the present inventors have noted that fiber waste produced in the course of the raising treatment or shearing treatment sometimes remain on the plush. The remaining fiber waste is tend to emigrate onto a photosensitive surface of a photographic film when it is drawn out of the film cartridge. Otherwise, the remaining fiber waste is apt to emigrate into a production system for manufacture of a film cartridge and then is transferred onto a photosensitive surface of a photographic film. The photographic film having fiber waste on its photosensitive surface produces a defective photographic image after it is developed. Particularly, if the photographic image is enlarged, the defects are apparently noted.

Accordingly, it is an object of the present invention to provide a plush to be fitted to a photographic film cartridge at its slit through which a photographic film is drawn out, which scarcely produces apparent defects on a photographic image, particularly on an enlarged photographic image.

It is another object of the invention to provide a photographic film cartridge which scarcely produces apparent defects on a photographic image, particularly on an enlarged photographic image.

DISCLOSURE OF THE INVENTION

The present invention resides in a light-shielding cloth (plush) to be fitted to a photographic film cartridge at its slit through which a photographic film is drawn out, which has been subjected to raising treatment and has fiber waste of 30 pieces or less per 1 $cm^2$, preferably 20 pieces or less per 1 $cm^2$, on its surface.

The number of pieces of fiber waste defined above means a number which is determined by the following method:

(1) a plush is placed on a pressure-sensitive adhesive tape (generally called "cellophane tape" such as "Cellotape" available from Nichiban Co., Ltd.) to produce a laminated body;

(2) the laminated body is pressed by means of a press roller (2 kg, width 45 mm, diameter: 95 mm); and (3) The adhesive tape is peeled off from the plush, and the pieces of fiber waste transferred onto the tape are counted.

Thus counted number corresponds to the number of pieces of fiber waste on the surface of plush which is defined in the invention.

The plush of the invention is preferably produced by a process in which a cloth in the form of a continuous web having been subjected to raising treatment is immersed in water for removing fiber waste, dried, and cut.

The plush of the invention is preferably produced by a process comprising a step in which a cloth in the form of a continuous web is subjected to a set of raising treatments comprising a rough raising treatment and a fine raising treatment.

In the invention, the plush preferably is a light-shielding woven cloth having been subjected to raising treatment. When the cloth is a woven cloth, it preferably comprises a weft of two or three ply spun yarn or filament yarn. The woven cloth preferably comprises polyester fibers or polyamide fibers.

The invention also resides in a photographic film cartridge having a slit for drawing out a photographic film therethrough to which a light-shielding cloth is fitted, the light-shielding cloth having fiber waste of 30 pieces or less per 1 $cm^2$ on its surface.

PREFERRED EMBODIMENTS FOR CONDUCTING THE INVENTION

Figure 3:
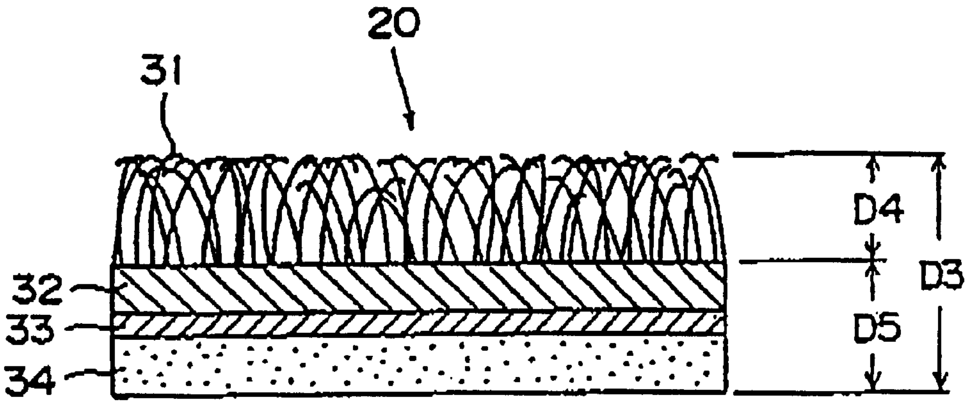
FIG. 3 is an enlarged view of a plush of the invention.

The section of a plush according to the invention is illustrated in FIG. 3. The plush 20 comprises a base cloth 32, a raised portion 31 which is produced by subjecting the base cloth 32 to raising treatment, an adhesive 34 for fixing the plush to a slit of a photographic film cartridge, and a filler agent 33 for keeping the adhesive from the base cloth. The raising treatment is generally applied to a continuous base cloth. The plush preferably has a thickness of 0.5 to 2.5 mm, more preferably 1.2 to 2.0 mm.

The height of the raised portion 31 (D4 in FIG. 3) preferably is in the range of 0.1 to 1.7 mm, from the viewpoint of film drawing-out resistance. The cloth having been subjected to raising treatment may be then subjected to shearing treatment. However, no shearing treatment is preferably applied to the raised portion.

The base cloth 32 may be a knitted cloth or a woven cloth. If the base cloth is a woven cloth, it preferably comprises a warp of filament yarn and a weft of spun or filament yarn of two or three ply. A two ply spun yarn is most preferred. The woven cloth preferably is a 3 to 5 ply satin fabric or of ⅓ or ¼ twill weave. Most preferred is a 4 or 5 ply satin fabric.

The raised portion 31 and the base cloth 32 preferably have a light-shield property and shows less electric chargeablity. The base cloth is preferably colored so as to increase its light-shielding property. There is no limitation with respect to the color and coloring procedure. A black-colored cloth is particularly preferred, because it can absorb light of a wide wavelength range and therefore a high light-shielding effect can be expected. The coloring procedure can be performed on a cloth. Otherwise, a colored fibers or are woven or knitted to produced a colored cloth.

When a photographic film is drawn out of a photographic film cartridge, a plush is sometimes charged with electricity in the course of rubbing of the plush with the film. Therefore, a base cloth preferably comprises an electroconductive material or an antistatic agent in its body or on its surface (coating). An example of the electro-conductive material is carbon black, which is also preferred from the viewpoint of light-shielding property because of its black color.

A filler agent 33 may be under no specific limitation, but preferably has an affinity to both of the base cloth 32 and the adhesive 34. Examples of the filler agents include natural rubber, casein, polyvinyl alcohol and its derivatives, polyacrylamide, vinyl methyl ether-maleic anhydride copolymer, and phenol resin.

The adhesive agent 34 may be a pressure sensitive adhesive or a hot-melt adhesive. There is no specific limitation with respect to its components. Examples of the pressure-sensitive adhesives include rubber adhesives, acrylate adhesives, and vinyl methyl ether-maleic anhydride copolymer. Examples of the hot-melt adhesives include ethylene-vinyl acetate copolymer and polyamide.

If desired, a filler-adhesive agent which can serve as the filler agent and also as the adhesive may be employed in place of the filler agent 33.

The plush of the invention can be prepared by the following procedures.

One surface of a continuous woven or knitted cloth is subjected to raising treatment, and immersed in water to remove fiber dusts and dried. Another surface which has not been subjected to raising treatment is coated with a filler agent and dried. On the dried filler agent coat, an adhesive is coated and dried. Thus treated raised continuous cloth is then cut to give cloth pieces (plushes) of desired sizes.

If the continuous cloth is dyed in advance of being subjected to raising treatment, the continuous cloth may be subjected to heat treatment prior to the dyeing (namely, pre-heat setting). The pre-heat setting can be performed by applying a hot air (for instance, heated to 180° C.) to the continuous cloth. In the course of pre-heat setting, the continuous cloth is preferably stretched or extended in the width direction by approximately 1 to 5% range.

The raising treatment can be performed by a conventional method such as a method in which a continuous cloth transferred in one direction is rubbed with a needle-mounted cloth roller which rotates in a direction opposite to the direction of transfer of the continuous cloth. The raising treatment can be preferably performed utilizing a combination of a first rough raising treatment end a second fine raising treatment. After the fine raising treatment, a rough raising treatment again can be performed. The rough raising treatment is conducted for producing raised portions having a large height at a small raising density, while the fine raising treatment is conducted for producing raised portions having a small height at a large raising density. The rough raising treatment and fine raising treatment can be conducted by adjusting appropriately the transfer rate of the continuous cloth, the rotation rate of the roller, and the height or number of needles, and torque of contact of the continuous cloth with the needle-mounted cloth roller.

The continuous cloth having been subjected to raising treatment can be further subjected to raising treatment by transferring in an opposite direction. There is no specific limitation with respect to the number of raising treatments. However, if the raising treatment is repeatedly applied to the continuous cloth, the number of raised portions increases, and further the raising density increases, so that the continuous cloth would have well raised surface.

The immersion of the raised cloth can be performed by immersing the raised cloth in water under the condition that the raised surface is kept upward. Water may be ware water. In the course of the immersing treatment, fiber dusts remaining on the raised cloth are released from the cloth and then floated on the water. There are no specific limitations with respect to the immersion period, but immersion of 3 seconds or more is preferred.

After the immersion treatment is complete, the continuous cloth is recovered from the water in such manner that the floated fiber dusts are not again placed on the cloth. The continuous cloth is then dried by applying to the cloth an air heated to 100–200° C., preferably 120–130° C. If a continuous woven cloth is employed, the woven cloth is preferably extended or stretched in the width direction in the course of the heat treatment (application of a heated air) so as to extend the width length by a range of approximately 1 to 5%, so as to adjust the deformed weft yarn. This procedure is called "width size-adjusting heat set".

After the continuous cloth is dried, it can be subjected to a press roller to adjust the thickness of the cloth. Preferably, the continuous cloth is heated under pressure. The heating/pressing treatment can stabilize the conditions of raised portions on the cloth.

For instance, a raised continuous cloth is preferably heated to 30–150° C. (more preferably 90–120° C. or 40–80° C.) when it is passed within a calender roller comprising 2 to 5 rollers and having a slit clearance of 1.2 to 2.0 mm. If the temperature of the race of the calender roller is extremely high, the raised portions of the cloth become hard, so that the effect of the raising treatment is decreased and the raised portions likely give a damage to the race of the photographic film.

INDUSTRIAL UTILITY

The plush of the invention has only a small number of fiber waste pieces on its surface. Therefore, a photographic film drawn out from a photographic film cartridge equipped with plushes of the invention has only a small number of fiber waste pieces on its surface. Accordingly, a photographic film cartridge equipped with the plushes of the invention hardly form defects on a photographic image, particularly on an enlarged photographic image, which is produced on a photographic film having been encased in the cartridge. Further, the plush of the invention is prepared by raising treatment with high productivity and therefore can be produced at a low cost.

The present invention is further described by the following examples and comparison examples.

Production of Plush

EXAMPLE 1

A base cloth was a woven five satin cloth which was prepared by employing a warp yarn (prepared by air-entangling two black 210 deniers/34 polyamide filament yarns) and a weft yarn (prepared by twisting five black 70 deniers/68 polyamide filament yarns: twisted 200 times/m) and weaving at a density of gray cloth of 68 inches 15 (warp)×70 inches (weft).

One surface of the base cloth was subjected in series to rough raising treatment, fine raising treatment, and rough raising treatment in a raising machine. Thus raised base cloth was immersed in water for 7 seconds and dried by applying to the cloth an air heated to 180° C., for removing fiber waste and other dusts. The base cloth was then passed by passing through calender rollers having a slit clearance of 1.5 mm and a surface temperature of 100° C., to adjust the thickness of the cloth. On the surface of the cloth opposite to the raised surface, an acrylate resin (filler agent) was evenly coated and dried to form a layer of a coated amount of 40 g/m$^2$. On the acrylate resin layer was coated an acrylate adhesive, and the coated adhesive was dried to form an adhesive layer of a coated amount of 70 g/m$^2$.

A plush was thus produced.

EXAMPLE 2

A base cloth was a woven five satin cloth which was prepared by employing a weft yarn (prepared by twisting four 100 deniers/96 polyester filament yarns: twisted 150 number/m) and a warp yarn of polyester spun yarn (cotton count: 12/1) and weak at a density of gray cloth of 70 inches (warp)×73 inches (weft). The base cloth was then dyed to have black color.

One surface of the base cloth was subjected to raising treatments in series in the manner described in Example 1, immersed in water and dried. The dried base cloth was then adjusted in its thickness.

On the surface of the cloth opposite to the raised surface, an vinyl acetate resin (filler agent) was evenly coated and dried to form a layer of a coated amount of 40 q/m$^2$. On the vinyl acetate resin layer was coated a hot-melt adhesive. The coated adhesive was dried to form an adhesive layer of a coated amount of 80 g/m$^2$.

A plush was thus produced.

EXAMPLE 3

A base cloth as a woven four satin cloth which was prepared by employing a 75 deniers/36 polyester filament warp yarn and a weft yarn of twisted two polyester spun yarn (cotton count: 20/1) and weaving at a density of gray cloth of 90 inches (warp)×65 inches (weft). The base cloth was subjected to pre-heat setting by applying a hot air (heated to 180° C.) for 30 seconds to the cloth, and then dyed to have black color.

One surface (having weft satin pattern) of the base cloth was repeatedly subjected to a combination of rough raising treatment and fine raising treatment in a raising machine so that the total thickness of the base cloth and the raised portion would become 1.6 mm. Thus raised base cloth was immersed in water for 5 seconds and dried by applying to the cloth an air heated to 120° C. During the drying procedure, the base cloth was stretched in its width direction to extend the width by approximately 1% (width direction size-adjusting heat setting). On the surface of the cloth opposite to the raised surface, a vinyl acetate resin (filler agent) was evenly coated and dried to form a layer of a coated amount of 40 g/m$^2$. On the vinyl acetate resin layer was coated a hot-melt adhesive, and the coated adhesive was dried to form an adhesive layer of a coated amount of 70 g/m$^2$.

A plush was thus produced.

EXAMPLE 4

A base cloth was a woven five satin cloth which was prepared by employing a black 210 deniers/34 polyamide filament warp yarn and a weft yarn of twisted two black 2 deniers×51 mm cotton fiber/polyamide fiber (cotton count: 20/1) and weaving at a density of gray cloth of 62 inches (warp)×62 inches (weft).

One surface of the base cloth was repeatedly subjected to raising treatment in the manner described in Example 3 so that the total thickness of the base cloth and the raised portion would become 1.6 mm. Thus raised base cloth was immersed in water and dried. During the drying procedure, the base cloth was stretched in its width direction to extend the width by approximately 1% (width direction size-adjusting heat setting). On the surface of the cloth opposite to the raised surface, a vinyl acetate resin (filler agent) was evenly coated and dried to form a layer of a coated amount of 40 g/m$^2$. On the vinyl acetate resin layer was coated a hot-melt adhesive, and the coated adhesive was dried to form an adhesive layer of a coated amount of 70 g/m$^2$.

A plush was thus produced.

EXAMPLE 5

A base cloth was a woven five satin cloth which was prepared by employing a 150 deniers/48 polyester filament warp yarn and a weft yarn of twisted two cotton fiber (having modified section in the form of H)/polyamide fiber (cotton count: 20/1) and weaving at a density of gray cloth of 82 inches (warp)×65 inches (weft). The base cloth was exposed to a hot air of 180° C. for 30 seconds (pre-heat setting), and dyed to have a black color.

One surface of the base cloth was repeatedly subjected to raising treatment in the manner described in Example 3 so that the total thickness of the base cloth and the raised portion would become 1.6 mm. Thus raised base cloth was immersed in water and dried. During the drying procedure, the base cloth was stretched in its width direction to extend the width by approximately 1% (width direction size-adjusting heat setting). On the surface of the cloth opposite to the raised surface, a vinyl acetate resin (filler agent) was evenly coated and dried to form a layer of a coated amount of 40 g/m$^2$. On the vinyl acetate resin layer was coated a hot-melt adhesive, and the coated adhesive was dried to form an adhesive layer of a coated amount of 70 g/m$^2$.

A plush was thus produced.

COMPARISON EXAMPLE 1

The procedures of Example 1 were repeated except for not performing the step of removal of dusts from the raised surface of the base cloth, to give a plush.

COMPARISON EXAMPLE 2

The procedures of Example 1 were repeated except for conducting a shearing treatment after the raising treatment and further not performing the step of removal of dusts from the raised surface of the base cloth, to give a plush.

Preparation of Photographic Film Cartridge

Figure 1:
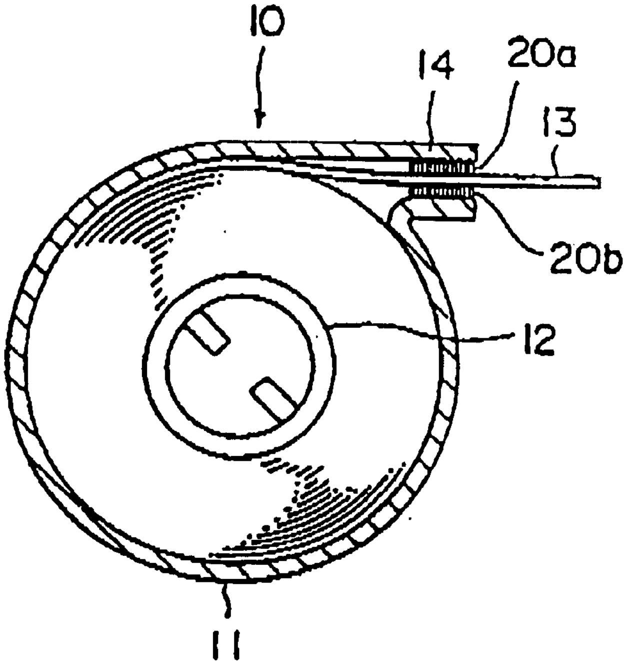
FIG. 1 PRIOR ART
FIG. 1 is a section of a representative photographic film cartridge.
Figure 2:
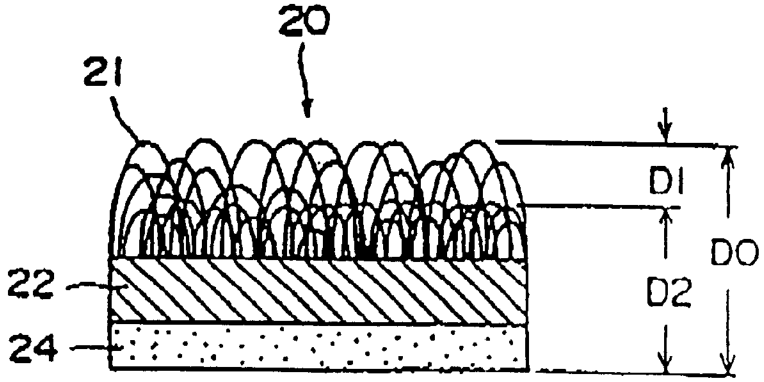
FIG. 2 PRIOR ART
FIG. 2 is an enlarged view of a conventional plush.

The plush obtained above was cut to give a plush sample of an appropriate size, and fixed to the inside of the slit 14 (port portion, for drawing out a photographic film) of a photographic film cartridge using the adhesive layer, as illustrated in FIG. 1. Thus, a JIS 135 photographic film cartridge was manufactured. The photographic film employed was a negative color photographic film (Fuji Color Super G ACE 400, available from Fuji Photo Film Co., Ltd.).

Evaluation and Results

Each of the plushes obtained above was subjected to determination of a number of fiber waste pieces remaining on the raised surface. The results are shown in Table 1.

The photographic film cartridge was allowed to stand for 24 hours at room temperature, and then (1) Photographic film draw-out resistance, (2) Light-shielding property, (3) Amount of fiber waste pieces, and (4) Photographic image were all evaluated by the following procedures. The results are set forth in Table 2, in which AA means "excellent"; BB means "no problem in practical uses"; and CC means "employable but should be improved because it may cause certain troubles".

(1) Photographic Film Draw-out Resistance

The resistance in the procedure of drawing out the photographic film was measured using an Instron tensile machine.

(2) Light-shielding Property

The slit portion was exposed to a light of 90,000 lux for 30 minutes, and the photographic film was developed. Any fog formed on the developed photographic image by a light passing through the slit was visually checked.

(3) Amount of Fiber Waste Pieces

The photographic film cartridge was vibrated for 10 minutes using a vibrator, and then the cartridge was broken to visually check the amount of fiber waste pieces attached onto the photographic film and the inner wall of the cartridge case.

(4) Photographic Image

The developed photographic image was enlarged two times (in the both directions), and observed visually to find out defective portion.

TABLE 1

| | Number of Fiber Wastes on Plush (number/cm$^2$) |
|---|---|
| Example 1 | 15 |
| Example 2 | 19 |
| Example 3 | 15 |
| Example 4 | 14 |
| Example 5 | 19 |
| Com. Ex. 1 | 35 |
| Com. Ex. 2 | 40 |

TABLE 2

| | (1)Resistance | (2)Light-shielding | (3)Amount fiber waste | (4)Photo-image |
|---|---|---|---|---|
| Example 1 | AA | AA | AA | AA |
| Example 2 | AA | AA | AA | AA |
| Example 3 | AA | AA | AA | AA |
| Example 4 | AA | AA | AA | AA |
| Example 5 | AA | AA | AA | AA |
| Com. Ex. 1 | AA | AA | BB | BB |
| Com. Ex. 2 | CC | BB | CC | BB |

EXAMPLE 6

A base cloth was a ⅓ twill woven cloth which was prepared by employing a 150 deniers/72 polyester filament warp yarn and a weft yarn of twisted three polyester spun yarn (cotton count: 30/1) and weaving at a density of gray cloth of 75 inches (warp)×65 inches (weft). The base cloth was subjected to pre-heat setting by applying a hot air (heated to 180° C.) for 30 seconds to the cloth, and then dyed to have black color.

One surface (having weft satin pattern) of the base cloth was repeatedly subjected to a combination of rough raising treatment and fine raising treatment in a raising machine so that the total thickness of the base cloth and the raised portion would become 1.75 mm. Thus raised base cloth was immersed in water for 5 seconds and dried by applying to the cloth an air heated to 120° C. During the drying procedure, the base cloth was stretched in its width direction to extend the width by approximately 1% (width direction size-adjusting heat setting). On the surface of the cloth opposite to the raised surface, a vinyl acetate resin (filler agent) was evenly coated and dried to form a layer of a coated amount of 40 $g/m^2$. On the vinyl acetate resin layer was coated a hot-melt adhesive, and the coated adhesive was dried to form an adhesive layer of a coated amount of 70 $g/m^2$.

A plush thus produced was subjected to determination of the number of fiber wastes. It was confirmed that fiber waste of less than 30 pieces/$cm^2$ remained on the plush.

What is claimed is:

1. A process for producing a continuous light shielding cloth web to be fitted to a slit of a photographic film cartridge, the slit allowing a photographic film to be drawn out therethrough, the process consisting essentially of the steps of:

subjecting an active surface of a continuous cloth web to raising treatment comprising a combination of a rough raising treatment and a subsequent fine raising treatment, whereby the active surface becomes to have a number of raised loops having different heights, most of the raised loops having broken tops;

immersing the raised continuous cloth web in water, thereby removing fiber dusts from the raised surface until the number of fiber dusts remaining on the raised surface reaches 30 pieces or less per 1 $cm^2$, the fiber dusts having been produced by the combined raising treatments;

recovering the immersed cloth web from water; and drying the recovered continuous cloth, web, thereby obtaining the continuous light shielding cloth web.

* * * * *